United States Patent
Yamada et al.

(10) Patent No.: US 6,275,368 B1
(45) Date of Patent: Aug. 14, 2001

(54) METHOD AND APPARATUS FOR CONTROLLING ELECTROMAGNETIC VALVE IN INDUSTRIAL VEHICLE

(75) Inventors: Tadashi Yamada; Hiroo Ito, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/243,712

(22) Filed: Feb. 3, 1999

(30) Foreign Application Priority Data

Feb. 6, 1998 (JP) .................................... 10-026054

(51) Int. Cl.$^7$ .................................................. H01H 47/00
(52) U.S. Cl. ............................................ 361/140; 361/187
(58) Field of Search .................................. 361/140, 144, 361/153, 154, 187

(56) References Cited

U.S. PATENT DOCUMENTS

| 4,221,156 | 9/1980 | Zirps et al. ............................ 91/407 |
| 4,723,107 | 2/1988 | Schmid .................................. 322/35 |

FOREIGN PATENT DOCUMENTS

| 2742424A1 | 3/1979 | (DE) .............................. A01B/63/10 |
| 3905937A1 | 8/1990 | (DE) ................................. H01F/7/18 |
| 3910810A1 | 10/1990 | (DE) ................................. H01F/7/18 |
| 4430056A1 | 3/1995 | (DE) ................................. B66F/9/24 |
| 0230884A2 | 8/1987 | (EP) ................................. B66F/9/22 |
| 58-211903 | 12/1983 | (JP) ................................. B60G/9/02 |
| 63-203982 | 8/1988 | (JP) .............................. F16K/31/06 |
| 63-214585 | 9/1988 | (JP) .............................. F16K/31/06 |
| WO 94/13991 | 6/1994 | (WO) ............................. F16K/37/00 |

OTHER PUBLICATIONS

Patent Abstracts of Japan Publication No. 07061788, published Mar. 7, 1995.

*Primary Examiner*—Ronald W. Leja
(74) *Attorney, Agent, or Firm*—Morgan & Finnegan, LLP

(57) ABSTRACT

A method and an apparatus for preventing a solenoid from being heated by an exciting current. When a hydraulic cylinder is permitted to extend and retract, a controller commands a high-side driver to send a moving current to the solenoid such that a valve body of an electromagnetic valve is moved to a connection position. Subsequently, the controller commands the high side driver to send a maintaining current to the solenoid such that the valve body is maintained at the connection position. The moving current and the maintaining current are pulse waves. The duty ratio of the maintaining current is smaller than that of the moving current.

17 Claims, 4 Drawing Sheets

US 6,275,368 B1

METHOD AND APPARATUS FOR CONTROLLING ELECTROMAGNETIC VALVE IN INDUSTRIAL VEHICLE

BACKGROUND OF THE INVENTION

The present invention relates to a mechanism for controlling pivoting of the rear axle of an industrial vehicle, such as a forklift. More specifically, the present invention pertains to a method and an apparatus for controlling an electromagnetic valve in a hydraulic circuit of the pivot controlling mechanism.

In a typical industrial vehicle such as a forklift, an axle for supporting the rear wheels pivots relative to a body frame in order to stabilize the body frame. However, if the vehicle is steered to change directions, pivoting of the rear axle may incline the body frame and thus destabilize the vehicle. The vehicle therefore has a mechanism for locking the rear axle when the vehicle is changing direction.

The axle locking mechanism includes a hydraulic circuit having a hydraulic cylinder. The hydraulic cylinder is located between the body frame and the rear axle and has two oil chambers. The oil chambers are connected to each other by an oil passage. An electromagnetic valve is located in the oil passage. Pivoting of the rear axle extends and retracts the hydraulic cylinder. In order to control the pivoting of the rear axle, the extension and retraction of the hydraulic cylinder are controlled. When the rear axle is allowed to pivot, the electromagnetic valve is open, allowing the oil chambers to communicate with each other, thereby allowing reciprocation of the hydraulic cylinder. On the other hand, when locking the rear axle, the electromagnetic valve disconnects the oil chambers from each other.

The electromagnetic valve is a two-way switch valve having a valve body that is moved between a connection position which allows the oil chambers to communicate with each other and a disconnection position for disconnecting the oil chambers. The position of the valve body is determined by the equilibrium of the force of a spring used to urge the valve body toward the disconnection position and the force of a solenoid that urges the valve body toward the connection position. When the solenoid is not excited, the force of the spring places the valve body in the disconnection position. When the solenoid is excited, the force of the solenoid surpasses the force of the spring and puts the valve body in the connection position. The electromagnetic valve is controlled by a controller, which also controls the pivoting of the rear axle.

When the forklift is carrying a relatively heavy load at a relatively high position, the controller does not excite the solenoid. Thus, the valve body is in the disconnection position and the rear axle is locked. When the forklift is carrying a relatively light load at a relatively low position, the controller excites the solenoid. This places the valve body in the connection position and allows the rear axle to pivot.

As described above, the solenoid does not place the valve body in the connection position unless it is excited. Therefore, when the solenoid malfunctions, the rear axle may be prevented from pivoting.

The electromagnetic valve is exposed to heat from the vehicle engine. The oil in the hydraulic circuit flows as the rear axle pivots. Frequent pivoting of the rear axle raises the temperature of the oil, which further raises the temperature of the circuit. Allowing the rear axle to continually pivot over an extended period of time, that is, exciting the solenoid for a long period of time raises the temperature of the solenoid. Consequently, the electromagnetic valve is excessively heated, which causes the solenoid to malfunction.

SUMMARY OF THE INVENTION

It is an objective of the present invention to provide a method and an apparatus for controlling an electromagnetic valve actuated by a solenoid that prevents the solenoid from being excessively heated.

To achieve above objective, the present invention provides a method for controlling an electromagnetic valve that includes a power source, a solenoid excited by the power source and a valve body, which is switched between a first position and a second position. The valve body is urged toward the second position. The method includes the steps of (a) supplying a moving current to the solenoid for moving the valve body from the second position to the first position, and (b) supplying a maintaining current, the value of which is smaller than that of the moving current, to the solenoid after the step (a) for maintaining the valve body at the first position.

The present invention also provides a controller for controlling the electromagnetic valve. The controller includes a driver and a processor. The driver applies a voltage to the solenoid. The processor sends a command to the driver indicative of the value of the voltage to be applied to the solenoid. When moving the valve body from the second position to the first position, the processor sends a moving command signal to the driver for applying a moving voltage to the solenoid for a predetermined period. When maintaining the valve body at the first position, the processor computes a maintaining current, which is slightly greater than the minimum current for maintaining the valve body at the first position, and sends a maintaining command signal to the driver for applying a maintaining voltage subsequent to the predetermined period. The maintaining voltage generates the maintaining current in the solenoid.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A first embodiment of a controller 26 for controlling an electromagnetic valve will now be described with reference to FIGS. 1–4. The valve controller 26 shown in FIGS. 1–4 is used in a pivot controlling mechanism for controlling a rear axle 11 of a forklift. However, it will be understood that the controller 26 may be used in other pivot controlling mechanisms, especially those susceptible to exposure to excessive heat.

Figure 3:
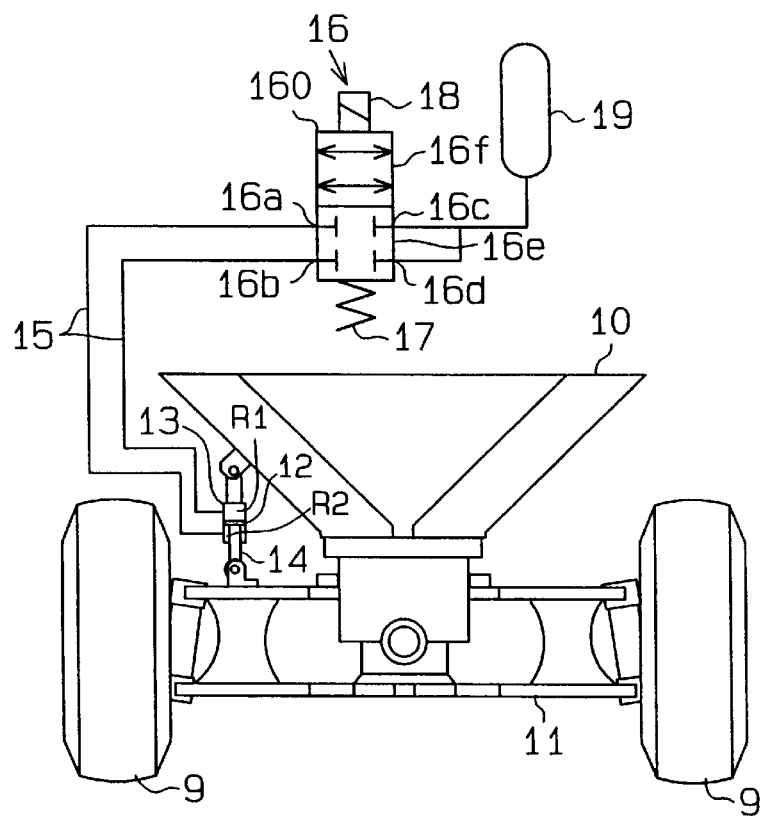
FIG. 3 is a diagrammatic view showing a hydraulic circuit of the pivot controlling mechanism of FIG. 1.

As illustrated in FIG. 3, a body frame 10 of the forklift is pivotally supported on the rear axle 11. Rear wheels 9 are connected to the sides of the axle 11. A hydraulic cylinder 12 is located between the body frame 10 and the rear axle 11. The cylinder 12 includes a housing 13 and a piston rod 14. The housing 13 is coupled to the body frame 10 and the piston rod 14 is coupled to the rear axle 11. The piston rod 14 includes a piston head (not shown), which is housed in the housing 13. The piston head slides in the longitudinal direction of the housing 13.

The interior of the cylinder 12 is divided into a first oil chamber R1 and a second oil chamber R2 by the piston head. The first oil chamber R1 is located at a side closer to the body frame 10 and the second oil chamber R2 is located at the other side, which is closer to the rear axle 11. The first and second oil chambers R1, R2 are connected and in fluid communication with each other by an oil passage 15. The oil passage 15 includes an electromagnetic valve 16, which connects and disconnects the oil chambers R1, R2 with each other. That is, the valve 16 either allows or prevents fluid communication between the chambers R1, R2.

The electromagnetic valve 16 is preferably a two-way switch valve and has a valve body 160. The valve body 160 is switched between a disconnection position 16e and a connection position 16f. The valve 16 has four ports 16a, 16b, 16c and 16d. The port 16a is connected to the oil chamber R2 by the oil passage 15. The port 16b is connected to the oil chamber R1 by the oil passage 15. The ports 16c, 16d are connected to an accumulator 19, which stores hydraulic oil.

When the valve body 160 is at the disconnection position 16e, the port 16a and the port 16b are blocked as illustrated in FIG. 3. In this state, hydraulic oil is prevented from flowing between the chambers R1, R2. Accordingly, the piston rod 14 is locked relative to the housing 13, and the rear axle 11 cannot pivot. When the valve body 160 is at the connection position 16f, the port 16a and the port 16b are connected to each other by the ports 16c, 16d and the accumulator 19. This allows hydraulic oil to flow between the chambers R1, R2. Thus, the piston rod 14 is movable relative to the housing 13, and the rear axle 11 is pivotable relative to the body frame 10.

The electromagnetic valve 16 includes a coil spring 17 and a solenoid 18. The coil spring 17 urges the valve body 160 toward the disconnection position 16e. When excited, the solenoid 18 moves the valve body 160 against the force of the spring 17 and moves the valve body 160 to the connection position 16f.

An electrical current required for moving the valve body 160 from the disconnection position 16e to the connection position 16f, or a first exciting current PD1 is greater than a current required for maintaining the valve body 160 at the connection position 16f, or a second exciting current PD2.

Figure 2:
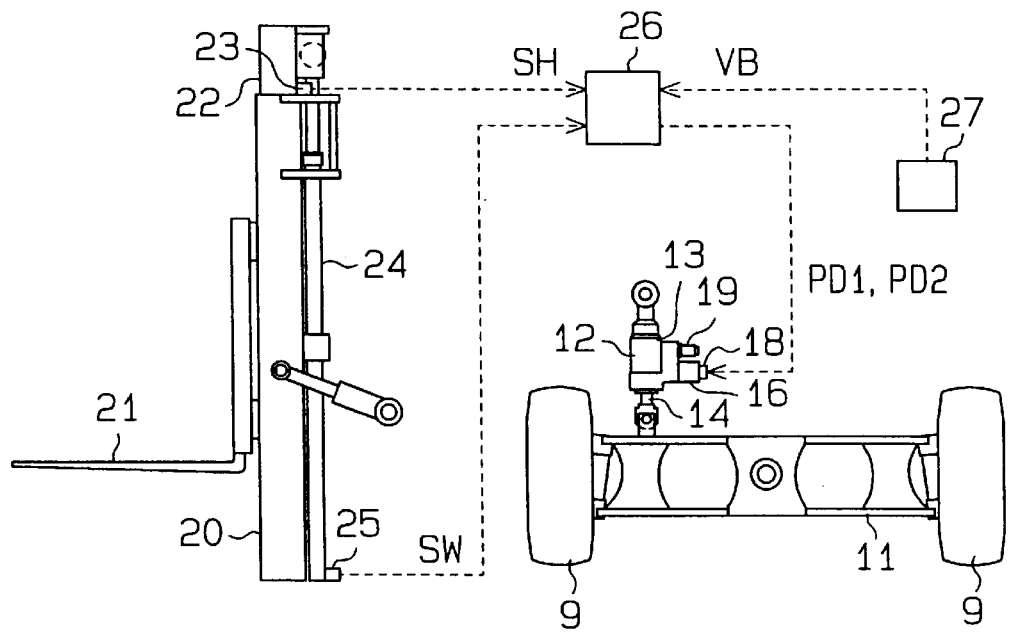
FIG. 2 is a diagrammatic view showing a pivot controlling mechanism having the valve controller of FIG. 1.

As illustrated in FIG. 2, the controller 26 is mounted on the body frame 10. The controller 26 is connected to a battery 27 and controls the valve 16. The battery 27 supplies a supply voltage VB to the solenoid 18 and the controller 26.

As illustrated in FIG. 2, a fork 21 is secured to an inner mast 22. The inner mast 22 is supported by a mast 20. The mast 20 includes a fork position sensor 23. The fork position sensor 23 is preferably a limit switch which detects the vertical position of the fork 21. The fork 21 is raised and lowered by two lift cylinders 24. One of the lift cylinders 24 has a pressure sensor 25. The pressure sensor 25 detects the pressure of oil in the associated lift cylinder 24. The detected pressure corresponds to the weight on the fork 21. The solenoid 18, the fork position sensor 23 and the pressure sensor 25 are electrically connected to the controller 26.

The electric circuit of the valve controller 26 will now be described.

As illustrated in FIG. 2, the fork position sensor 23 is connected to the controller 26. The fork position sensor 23 is turned off when the fork 21 is raised a predetermined height H0 or higher, and is turned on when the fork 21 located at a position lower than the height H0. The fork position sensor 23 sends a height signal SH to the controller 26. The value of the height signal SH represents the vertical position of the fork 21 relative to the height H0. The pressure sensor 25 detects the weight W of a load on the fork 21. The pressure sensor 25 sends an analog signal SW to the controller 26. The analog signal SW corresponds to the weight W. The controller 26 applies an exciting voltage VP to the solenoid 18 based on the height signal SH, the weight signal SW and the supply voltage VB. The applied exciting voltage VP generates an exciting current PD in the solenoid 18.

Figure 1:
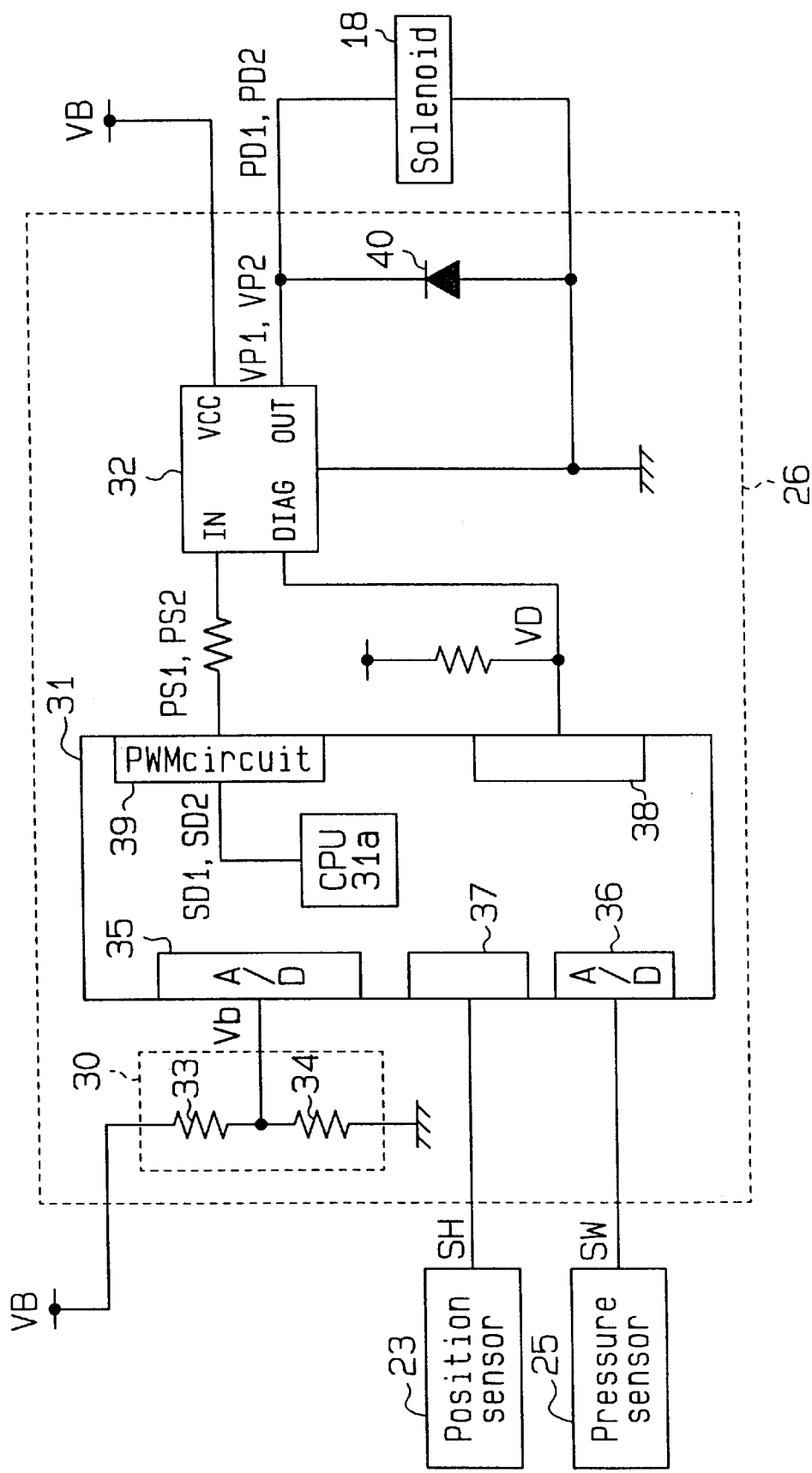
FIG. 1 is a schematic circuit diagram of a controller for controlling an electromagnetic valve according to a first embodiment of the present invention.

As shown in FIG. 1, the controller 26 includes a voltage detector 30, a microcomputer 31 and an intelligent high-side driver 32. The voltage detector 30 includes a resistors 33, 34. The voltage detector 30 detects the voltage VB of the battery 27 and sends a signal Vb, which indicates the detected voltage VB, to the microcomputer 31.

The microcomputer 31 includes a central processing unit (CPU) 31a, analog-to-digital (A/D) converters 35, 36, input interfaces 37, 38 and a pulse width modulation (PWM) circuit 39. The voltage signal Vb is input to the CPU 31a by way of the A/D converter 35. The height signal SH is input to the CPU 31a via the input interface 37. The weight signal SW is input to the CPU 31a via the A/D converter 36.

The CPU 31a generates a command signal SD based on the weight signal SW, the height signal SH and the voltage signal Vb at predetermined time intervals based, for example, on a frequency of three kHz. The PWM circuit 39 generates a pulse width modulation (PWM) signal PS based on the command signal SD and sends the PWM signal PS to the high-side driver 32. The PWM signal PS is a pulse signal that changes between a high voltage and a low voltage. The duty ratio of the pulse signal PS is D%.

The high-side driver 32 prevents the solenoid 18 from receiving overvoltage from the battery 27. The high-side driver 32 is preferably a conventional semiconductor chip (for example VN06 produced by SGS Thomson). The high-side driver 32 has an input terminal IN, a power supply terminal VCC, an output terminal OUT and a diagnostic terminal DIAG. The power supply terminal VCC receives the supply voltage VB (for example twelve volts), which is ultimately applied to the solenoid 18. The input terminal IN receives the PWM signal PS. The output terminal OUT is connected to the solenoid 18 and a flywheel diode 40.

The high-side driver 32, the solenoid 18 and the flywheel diode 40 are preferably connected to a common ground. The high-side driver 32 performs a pulse-width modulation of the direct voltage VB based on the PWM signal PS, such that it modulates the voltage VB into the exciting voltage VP, the duty ratio of which is D%. The exciting voltage VP is output from the output terminal OUT and provided to the solenoid 18 as the exciting current PD.

In this modulation, the supply voltage VB is not actually decreased to obtain the exciting voltage VP. Strictly speaking, the voltage of each pulse of the exciting voltage VP is equal to the supply voltage VB. However, each pulse of the exciting voltage VP is extremely short (a few milliseconds). Thus, the apparent value of the exciting voltage VP is equal to the voltage VB multiplied by the duty ratio D. For example, when the duty ratio D of the PWM signal PS is zero percent, the value of the exciting voltage VP is zero volts (=VE×0). When the duty ratio D is 100 percent, the exciting voltage VP is equal to the supply voltage VB. If the duty ratio D is sixty percent, the exciting voltage VP is equal to the supply voltage VB. However, the apparent value of the exciting voltage VP is equal to 0.6 VB, which is the voltage VB multiplied by sixty percent.

The high-side driver 32 has a self-diagnostic function. A diagnostic signal VD is output from the terminal DIAG every time a pulse signal is input to the input terminal IN. That is, the diagnostic signal VD is a pulse signal having the same duty ratio as the PWM signal PS.

When the voltage at the input terminal IN is low and the voltage at the output terminal OUT is zero volts, or when the voltage at the input terminal IN is high and the voltage at the output terminal OUT is the supply voltage VB, and there is no malfunction in the high-side driver 32, then the high-side driver 32 outputs the diagnostic signal VD having a high voltage through the diagnostic terminal DIAG. In other words, the diagnostic signal VD having a high voltage indicates that there is no malfunction in the high-side driver 32.

When the level of the signal at the input terminal IN does not correspond to the level of the signal output from the output terminal OUT, that is, when the voltage at the input terminal IN is low and the voltage at the output terminal OUT is the supply voltage VB or when the voltage at the input terminal IN is high and the voltage at the output terminal OUT is zero volts, the solenoid 18 is electrically open due to a breakage of the coil, or the solenoid 18 has a short circuit. For example, if the solenoid 18 has a short circuit, the output terminal OUT constantly outputs the supply voltage VB. This causes the solenoid 18 to be excessively heated and may consequently break down the solenoid 18. In this state, the high-side driver 32 outputs the diagnostic signal VD having a low voltage, which indicates that there is a malfunction.

The flywheel diode 40 prevents the controller 26 from being damaged by counter-electromotive force based on the inductance of the solenoid 18.

When an ignition switch (not shown) is turned on, the microcomputer 31 starts operating. The microcomputer 31 executes a predetermined control program at predetermined intervals. The control program contains a routine for controlling pivoting of the rear axle 11.

The microcomputer 31 determines whether the weight W of a load is equal to or greater than the reference value W0 and whether the fork position H is equal to or greater than the reference value H0 based on the height signal SH and the weight signal SW. If the weight W is equal to or greater than the value W0 and the vertical position H is equal to or greater than the value H0, the microcomputer 31 determines that the position of the fork 21 is relatively high and the load on the fork 21 is relatively heavy. In this state, the controller 26 inhibits the flow of current to the solenoid 18, thereby preventing pivoting of the rear axle 11. While the controller 26 supplies no current to the solenoid 18, the microcomputer 31 does not output the command signal PS. In this state, voltage applied to the input terminal IN is low, and the high-side driver 32 continues to output the diagnostic signal VD the duty ratio of which is 100% from the diagnostic terminal DIAG. The microcomputer 31 determines if there is a malfunction in the solenoid 18 based on the diagnostic signal VD. If the solenoid 18 has a short circuit, for example, the microcomputer 31 notifies an operator of the malfunction of the pivot controlling mechanism using an alarm device (not shown).

On the other hand, if the weight W is smaller than the reference value W0 or if the fork position H is smaller than the reference value H0, the microcomputer 31 determines that the position of the fork 21 is not relatively high and the load on the fork 21 is not relatively heavy. In this case, the controller 26 allows the hydraulic cylinder 12 to be extended or retracted thereby allowing the rear axle 11 to pivot.

Figure 4:
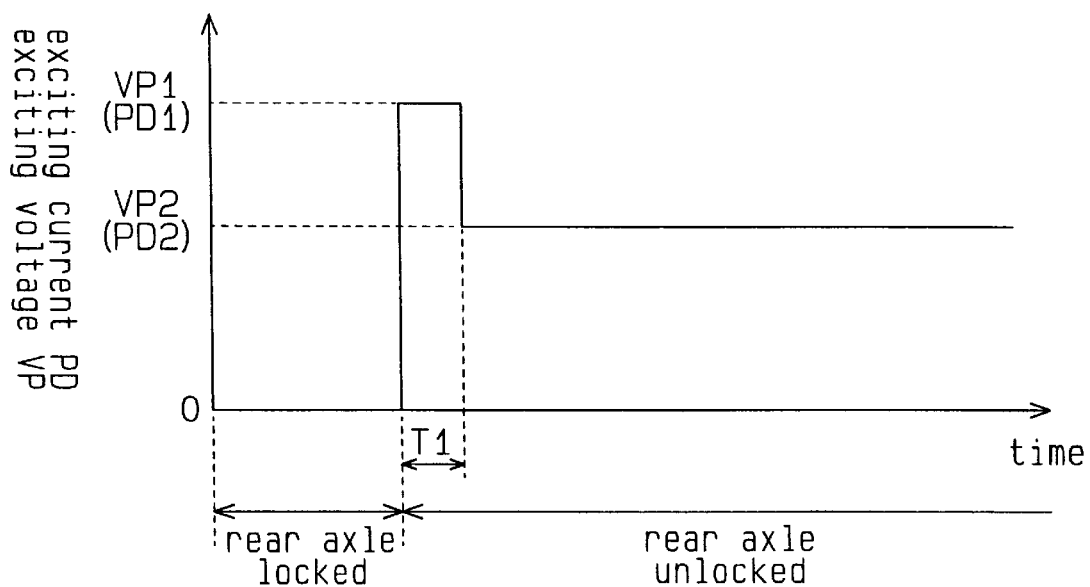
FIG. 4 is a timing chart showing the pattern of a voltage pulse output from the controller of FIG. 1.

At this time, the controller 26 continuously applies the exciting voltage VP to the solenoid 18, as shown in FIG. 4. The exciting voltage VP has two values VP1 and VP2. The first exciting voltage VP1 is applied for a predetermined period T1 (for example, one second). Thereafter, the second exciting voltage VP2 is applied to the solenoid 18. The first voltage VP1 generates a first exciting current PD1 in the solenoid 18. The first exciting current PD1 moves the valve body 16*b* to the connection position 16*f*. The second voltage VP2 generates a second exciting current PD2 in the solenoid 18. The second current PD2 maintains the valve body 16*b* at the connection position 16*f*. As previously discussed, a lower voltage value is required to maintain the valve body 16*b* in the connection position 16*f* than is required to move the valve body 16*b* to the connection position 16*f*.

When the CPU 31*a* outputs the first command signal SD1, the duty ratio of which is 100%, to the PWM circuit 39 for the period T1 the controller 26 supplies the first current PD1 to the solenoid 18. That is, upon receiving the signal SD1, the PWM circuit 39 outputs a first PWM signal PS1, the duty ratio of which is 100%, for the period T1. The high-side driver 32 then applies the supply voltage VB as the first exciting voltage VP1 to the solenoid 18 for the period T1. Consequently, the first exciting current PD1 is supplied to the solenoid 18 for the period T1.

The first exciting current PD1 is preferably equal to the rated operating current of the electromagnetic valve 16. The period T1, during which the current PD1 is supplied to the solenoid 18, is sufficiently long to move the valve body 16*b* from the disconnection position 16*e* to the connection position 16*f*.

On the other hand, in order to supply the second exciting current PD2, the CPU 31*a* outputs a second command signal SD2 to the PWM circuit 39. The second command signal SD2 indicates a duty ratio of Dh% (Dh<100). The PWM circuit 39 outputs a second PWM signal PS2 to the high-side driver 32 based on the second command signal SD2. The high-side driver 32 modulates the direct supply voltage VB to the second exciting voltage VP2 based on the duty ratio Dh, and applies the second exciting voltage VP2 to the solenoid 18. The voltage VP2 generates the second exciting current PD2 in the solenoid 18. The second exciting current PD2 generates a force that acts against the force of the coil spring 17. Specifically, the value of the current PD2 is sufficiently great to maintain the valve body 16*b* at the connection position 16*f* against the force of the coil spring 17. The second exciting current PD2 has a smaller value than the first exciting current PD1.

In the presently preferred embodiment, the duty ratio Dh is computed by the CPU 31*a* using the following equation (1).

$$Dh(\%) > Ih/(VB/Rsol) \times 100 \quad (1)$$

In equation (1), Ih is a minimum current for maintaining the valve body 160 at the connection position 16f. Rsol is the internal resistance of the solenoid 18 at the possible maximum temperature (Tmax) of the electromagnetic valve 16. That is, when computing the duty ratio Dh, the internal resistance of the solenoid 18 at the maximum temperature (Tmax) of the valve 16 is used.

The value of VB/Rsol indicates the value of a current when the voltage VB is applied to the resistance Rsol. Generally, the resistance of a material increases as its temperature increases. That is, the value Rsol is greater than the resistance of the solenoid 18 under normal temperature conditions. Thus, the duty ratio Dh is set such that the second exciting current PD2 is greater than the minimum current Ih and is smaller than current value when the voltage VB is applied to the solenoid 18. That is, the CPU 31 sets the duty ratio Dh such that (Ih<PD2<PD1) is satisfied. Further, since the CPU 31a monitors the value of the supply voltage VB, the second exciting current PD2 is always set greater than the minimum current Ih. The second exciting current PD2 is preferably slightly greater than the minimum current Ih.

The operation of the valve controller will now be described.

When the ignition switch is turned on, the microcomputer 31 executes the pivot control program at predetermined intervals. If the fork height H is equal to or greater than the reference value H0 and the weight W is equal to or greater than the reference value W0, the microcomputer 31 does not output the PWM signal PS to the high-side driver 32. In this state, the high-side driver 32 does not output the exciting current PD to the solenoid 18. Accordingly, the valve body 160 is maintained at the disconnection position 16e, which prohibits movement of the cylinder 12. Accordingly, the rear axle 11 is locked against pivoting.

When the fork height H is lower than the reference value H0, or when the load weight W is smaller than the reference value W0, the microcomputer 31 outputs the PWM signal PS from the PWM circuit 39 to the high-side driver 32. Then, as discussed above, the high-side driver 32 applies the first exciting voltage VP1 and the second exciting voltage VP2 from the output terminal OUT to the solenoid 18. This generates the first and second exciting currents PD1 and PD2.

When receiving the first exciting current PD1, the solenoid 18 moves the valve body 160 from the disconnection position 16e to the connection position 16f. This allows the hydraulic cylinder 12 to extend and retract thereby allowing the rear axle 11 to pivot. When the second exciting current PD2 is supplied to the solenoid 18, the solenoid 18 maintains the valve body 160 at the connection position 16f. As long as the second exciting current PD2 is fed to the solenoid 18, the rear axle 11 is permitted to pivot. Since, the value of the second exciting current PD2 is relatively small, the application of the current PD2 for a relatively long period of time does not excessively heat the solenoid 18.

While the high-side driver 32 is outputting the first exciting current VP1, or during the period T1, the microcomputer 31 monitors the solenoid 18 using the diagnostic signal VD. Since the duty ratio of the first exciting voltage VP1 is 100%, the duty ratio of the corresponding diagnostic signal VD is also 100%. The high-side driver 32 outputs the diagnostic signal VD for the period T1. When the diagnostic signal VD has a low voltage value, the coil of the solenoid 18 is broken or there is a short circuit in the solenoid 18. In this case, the microcomputer 31 determines that there is a malfunction and stops applying voltage to the solenoid 18 so that the valve body 160 is moved by the spring 17 to the disconnection position 16e and the rear axle 11 is thus locked against pivoting.

The high-side driver 32 is also temperature sensitive. When the temperature of the high-side driver 32 reaches about 150 degrees centigrade, the high-side driver 32 automatically decreases the value of the exciting voltage VP. This also locks the rear axle 11 against pivoting.

The embodiment of FIGS. 1–4 has the following advantages.

The controller 26 excites the solenoid 18 with the first exciting current PD1 thereby moving the valve body 160 from the disconnection position 16e to the connection position 16f. Then, the controller 26 sends the second exciting current PD2, the value of which is smaller than that of the first exciting current PD1, to the solenoid 18 to maintain the valve body 160 at the connection position 16f. Compared to the prior art, the valve body 160 is maintained at the connection position 16f by a current having a relatively small value. The smaller value of the current for maintaining the position of the valve body 160 suppresses excessive temperature increase of the solenoid 18.

The controller 26 supplies the first exciting current PD1 to the solenoid 18 for a necessary period to move the valve body 160 from the disconnection position 16e to the connection position 16f. Thus, the controller 26 does not need to detect the time when the valve body 160 is moved from the position 16e to the position 16f for determining when to switch the exciting current. This simplifies the construction of the controller 26.

The PWM circuit 39 generates the first and second exciting voltages VP1, VP2 based on the first and second command signals SD1, SD2 computed by the CPU 31a. The high-side driver 32 applies the first and second exciting voltages VP1, VP2 to the solenoid 18. This facilitates the supply of the first and second exciting currents PD1, PD2, which have different values.

The PWM circuit 39 outputs the first PWM signal PS1, the duty ratio D of which is 100%, for the period T1. Meanwhile, the microcomputer 31 determines whether there is a short circuit in the solenoid 18 and whether the solenoid 18 is electrically opened. Therefore, a malfunction of the solenoid 18 is detected by the controller 26.

While the microcomputer 31 is not outputting the command signal PS, that is, while the rear axle 11 is locked, the high-side driver 32 continues to output the diagnostic signal VD, which has the low level, from the diagnostic terminal DIAG. At this time, the duty ratio of the diagnostic signal VD is 100%. The value of the diagnostic signal VD permits the microcomputer 31 to determine whether there is a malfunction in the solenoid 18.

The CPU 31 computes the value of the second exciting current PD2 for maintaining the valve body 160 at the connection position 16f based on the supply voltage VB detected by the voltage detector 30, the minimum current Ih and the internal resistance Rsol of the solenoid 18 at the highest possible temperature of the solenoid 18. Therefore, the value of the second exciting current PD2 is controlled in accordance with changes in the supply voltage VB. This construction further suppresses the heat of the solenoid 18 and saves the power of the battery 27.

The intelligent high-side driver 32 is employed instead of a prior art current detecting circuit including a transistor, an operation amplifier and a resistor. Thus, the controller 26 reduces the number of parts. Further, the high-side driver 32 is directly connected to the CPU 31a without the requirement of an intervening analog-to-digital converter. This simplifies the construction of the controller 26.

An electromagnetic valve controlling apparatus according to a second embodiment of the present invention will now be described. The apparatus of the second embodiment differs from the first embodiment in that it applies a different exciting voltage to the solenoid.

Figure 5:
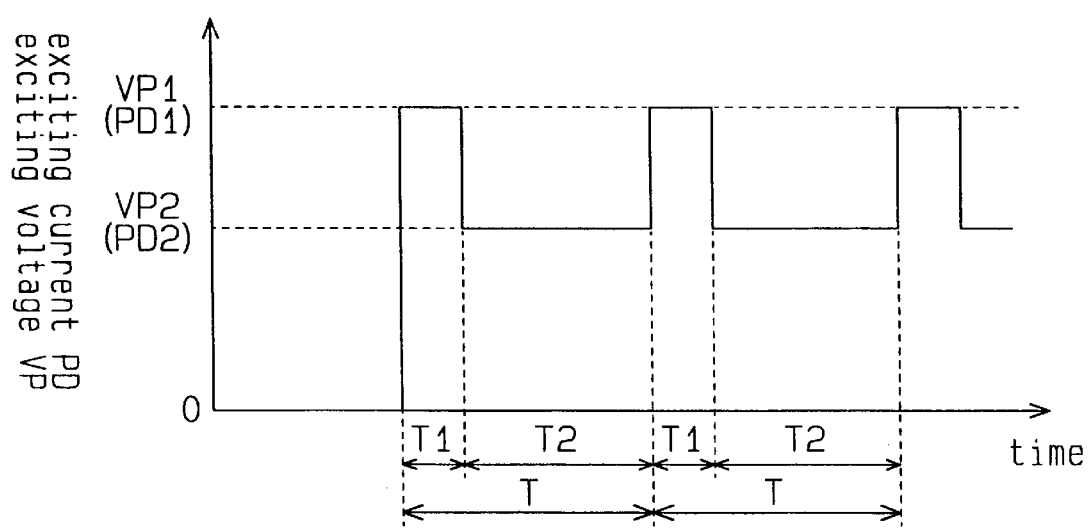
FIG. 5 is a timing chart showing the pattern of a voltage pulse output from a valve controller according to a second embodiment.

As illustrated in FIG. 5, the exciting current PD may include two currents PD1 and PD2 and have a predetermined cycle. The first exciting current PD1 is supplied to the solenoid 18 for a predetermined period T1 (for example, one second). Thereafter, the second current PD2 is supplied to the solenoid 18 for a predetermined period T2 (for example, three seconds). The first exciting current PD1 is supplied to the solenoid 18 for at least a part of every predetermined time interval T, which is the sum of the periods T1 and T2. Therefore, the valve body 160 is securely maintained at the connection position 16f.

In the second embodiment the duty ratio of the second exciting voltage VP2 is Dh% and the duty ratio of the diagnostic signal VD is Dh%. That is, each pulse of the diagnostic signal VD is outputted from the high-side driver 32 for a relatively short period. Therefore, while the high-side driver 32 is applying the second exciting voltage VP2 to the solenoid 18, or during the period T2, the microcomputer 31 cannot determine whether there is a malfunction based on the diagnostic signal VD.

In the embodiment of FIG. 5, the first PWM signal PS1, the duty ratio of which is 100%, is intermittently output. This allows the CPU 31a to determine whether there is a malfunction in the solenoid 18 every time the first exciting current PD1 is output.

Figure 6:
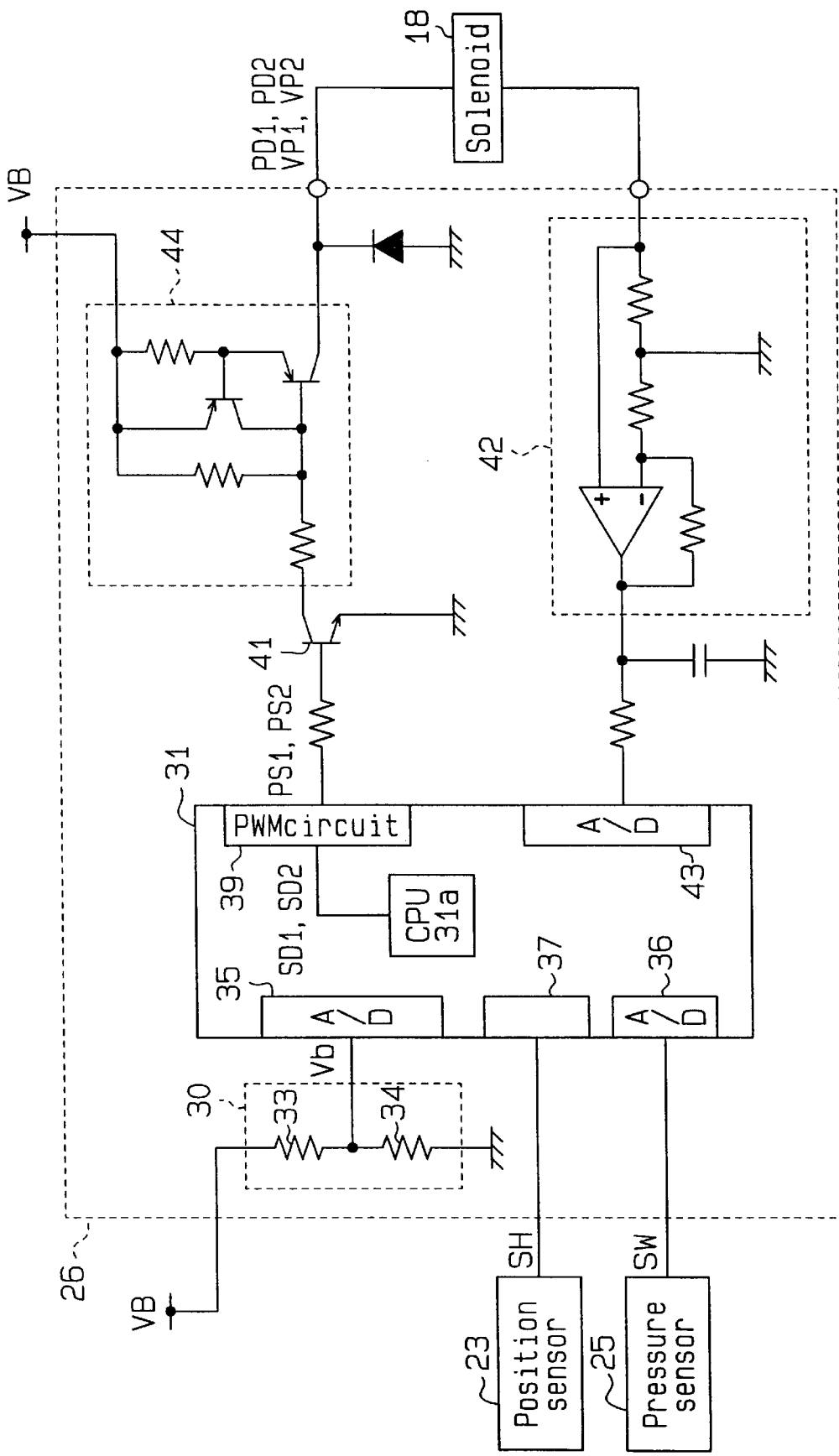
FIG. 6 is a schematic circuit diagram of a controller for controlling an electromagnetic valve according to a third embodiment of the present invention.

A third embodiment of the present invention will now be described with reference to FIG. 6.

In the third embodiment, the high-side driver 32 is replaced with a current detecting circuit 42, which includes a comparator and resistors, a transistor 41 and a current limiting circuit 44 for limiting excessive current. The current detecting circuit 42 detects the value of a current being supplied to the solenoid 18. A detection signal generated by the circuit 42 is input to the microcomputer 31 via an analog-to-digital converter 43. If the circuit 42 detects a current the value of which is greater than a predetermined value when the PWM signal PS is not being outputted, the microcomputer 31 determines that there is a short circuit between the solenoid 18 and the battery 27. On the other hand, if the circuit 42 does not detect the current greater than the predetermined value when the PWM signal PS is being output, the microcomputer 31 determines that the circuit is electrically open (for example, the solenoid 18 is broken).

The current limiting circuit 44 includes a pair of transistors and three resistors. When there is a short circuit in the solenoid 18, the circuit 44 prevents the solenoid 18 from receiving an excessive current.

It should be apparent to those skilled in the art that the present invention may be embodied in many other specific forms without departing from the spirit or scope of the invention. Particularly, it should be understood that the invention may be embodied in the following forms.

In the illustrated embodiments, the controller 26 is used in a forklift that controls pivoting of the rear axle 11 based on the weight W and the fork height H. However, the present invention may be embodied in a forklift that controls the pivoting of the rear axle based only on the fork height or on the load weight, the fork height and the inclination of the mast. In either case, the controller 26 prevents the solenoid 18, which is heated by exciting the coil 18, flow of hydraulic oil and the heat of the engine, from being excessively heated.

The value of the second exciting current PD2 may be constant as long as it is greater than the minimum current Ih. In this case, the controller 26 reduces the heat generated while the valve body 160 is maintained at the connection position 16f.

The electromagnetic valve 16 may have a position sensor for detecting that the valve body 160 is moved to the connection position 16f. When detecting that the valve body 160 is moved to the connection position 16f based on a signal from the position sensor, the controller 26 stops supplying the first exciting current PD1 to the solenoid 18 and starts supplying the second exciting current PD2 to the solenoid 18.

The duty ratio D of the first exciting current PD1 need not necessarily be 100%, but may be smaller than 100%. If the duty ratio D is smaller than 100%, a short circuit and a break in the solenoid 18 are difficult to detect. However, the heat generation of the solenoid 18 may still be suppressed.

The valve controller 26 according to the present invention may be employed in mechanisms other than the axle locking mechanism. For example, the controller 26 may be used in a mechanism for controlling tilting of a fork and a mast. The tilting controlling mechanism includes a hydraulic circuit having a hydraulic pump, a tilt cylinder, a manual flow control valve and an electromagnetic flow control valve. The oil pump supplies hydraulic oil to the tilt cylinder through the manual and electromagnetic valves. An operator controls the opening amount of the manual valve by manipulating a tilt lever. The electromagnetic valve controls the flow rate of oil from the manual valve to the tilt cylinder. Specifically, the electromagnetic valve switches the flow rate between two fixed values.

The electromagnetic valve of the tilt control mechanism includes a valve body and a solenoid. When the valve body is located at a disconnection position by urging means, the electromagnetic valve increases the flow rate of oil from the manual valve to the tilt cylinder. When the solenoid is excited, the valve body is moved to a connection position. In this state, the electromagnetic valve decreases the flow rate of the oil from the manual valve to the tilt cylinder.

The tilt control mechanism maintains the valve body at the disconnection position if the load on the fork is relatively light and the fork is at a relatively low position thereby allowing the mast to be quickly tilted in accordance with manipulation of the tilt lever. When the load on the fork is relatively heavy and the fork is at a relatively high position, the tilt control mechanism moves the valve body to the connection position thereby allowing the mast to be slowly tilted in accordance with manipulation of the tilt lever. The tilt control mechanism may include the electromagnetic valve controller 26 according to the present invention.

The valve controller 26 according to the present invention is suitable for suppressing generation of heat in solenoids. Thus, the valve controller 26 may be used in industrial vehicles other than forklifts.

Therefore, the present examples and embodiments are to be considered as illustrative and not restrictive and the invention is not to be limited to the details given herein, but may be modified within the scope and equivalence of the appended claims.

What is claimed is:

1. A method for controlling an electromagnetic valve that includes a power source, a solenoid excited by the power source and valve body, which is switched between a first position and a second position, wherein the valve body is urged toward the second position, the method including the steps of:

(a) supplying a moving current to the solenoid for moving the valve body from the second position to the first position; and (b) supplying a maintaining current, the value of which is smaller than that of the moving current, to the solenoid after the step (a) for maintaining the valve body at the first position, wherein the moving current and the maintaining current are pulse waves each having a different duty ratio, wherein the value of the maintaining current is computed by the steps of:

detecting the current voltage of the power source;

previously storing a reference current for maintaining the valve body at the first position and a reference resistance of the solenoid at a predetermined temperature of the solenoid;

computing a coefficient Dh using the following equation based on the current voltage of the power source, the reference current and the reference resistance, Dh>reference current/(current voltage/reference resistance), Dh<100%; and multiplying the moving current by the computed coefficient Dh to obtain the maintaining current such that the value of the maintaining current is slightly greater than the value of the reference current and is smaller than the value of the moving current.

2. The method according to claim 1, wherein the coefficient Dh is the duty ratio of the maintaining current.

3. A controller for controlling an electromagnetic valve that includes a solenoid excited by a power source and a valve body, which is switched between a first position and a second position, wherein the valve body is urged toward the second position, the controller comprising:

a driver for applying a voltage to the solenoid;

a processor for sending a command to the driver indicative of the value of the voltage to be applied to the solenoid, wherein when moving the valve body from the second position to the first position, the processor sends a moving command signal to the driver for applying a moving voltage to the solenoid for predetermined period, and when maintaining the valve body at the first position, the processor computes a maintaining current, which is slightly greater than the minimum current for maintaining the valve body at the first position, and sends a maintaining command signal to the driver for applying a maintaining voltage subsequent to the period, wherein the moving voltage and the maintaining voltage are pulse waves each having a different duty ratio, and wherein the maintaining voltage generates the maintaining current in the solenoid;

a voltage sensor for detecting the voltage of the power source; and a memory for storing a reference current for maintaining the valve body at the first position and a reference resistance of the solenoid at a predetermined temperature of the solenoid; and wherein the processor computes a coefficient Dh based on the current voltage of the power source, the reference current and the reference resistance, wherein the coefficient Dh is used for setting the value of the maintaining current.

4. The controller according to claim 3, wherein the predetermined period is equal to or slightly longer than a period required for the valve body to be moved from the second position to the first position.

5. The controller according to claim 4, wherein the moving command signal and the maintaining command signal are pulse signals each having a different duty ratio.

6. The controller according to claim 5, wherein the driver performs a pulse-width modulation of the voltage from the power source in accordance with the duty ratio of the moving command signal, and wherein the modulated moving voltage is applied to the solenoid to generate a current corresponding to the moving voltage in the solenoid.

7. The controller according to claim 6, wherein the duty ratios of the moving command signal, the moving voltage and the moving current are 100%.

8. The controller according to claim 5, wherein the driver performs a pulse-width modulation of the voltage from the power source in accordance with the duty ratio of the maintaining command signal, and wherein the modulated maintaining voltage is applied to the solenoid to generate a current corresponding to the maintaining voltage in the solenoid.

9. The controller according to claim 8, wherein the duty ratios of the maintaining command signal, the maintaining voltage and the maintaining current are less than 100%.

10. The controller according to claim 5 further including a current sensor for detecting a current in the solenoid, wherein the processor monitors the solenoid for a malfunction based on the solenoid current detected by the current sensor and the level of the maintaining command signal.

11. The controller according to claim 10, wherein the malfunction of the solenoid is either a short circuit between the power source and the solenoid or a break in the solenoid.

12. The controller according to claim 10, wherein when maintaining the valve body at the first position, the processor periodically outputs the maintaining command signal.

13. The controller according to claim 12, wherein the current sensor is integral with the driver.

14. The controller according to claim 5, wherein the electromagnetic valve is used in a hydraulic circuit of an axle pivot controlling mechanism for an industrial vehicle, and wherein the controller controls the opening amount of the electromagnetic valve.

15. A controller for controlling an electromagnetic valve that includes a solenoid excited by a power source and a valve body, which is switched between a first position and a second position, wherein the valve body is urged toward the second position, the controller comprising:

a driver for applying a voltage to the solenoid;

a processor for sending a command to the driver indicative of the value of the voltage to be applied to the solenoid, wherein when moving the valve body from the second position to the first position, the processor sends a moving command signal to the driver for applying a moving voltage to the solenoid for a predetermined period, wherein the predetermined period is equal to or slightly longer than a period required for the valve body to be moved from the second position to the first position, and when maintaining the valve body at the first position, the processor computes a maintaining current, which is slightly greater than the minimum current for maintaining the valve body at the first position, and sends a maintaining command signal to the driver for applying a maintaining voltage subsequent to the period, wherein the moving command signal and the maintaining command signal are pulse-width modulated signals each having a different duty ratio;

a voltage sensor for detecting the voltage of the power source; and a memory for storing a reference current for maintaining the valve body at the first position and a reference resistance of the solenoid at a predetermined temperature of the solenoid; and wherein the processor computes a coefficient Dh based on the current voltage of the power source, the reference current and the reference resistance, wherein the coefficient Dh is used for setting the value of the maintaining current.

16. The controller according to claim 15, wherein the driver performs a pulse-width modulation of the voltage from the power source in accordance with the duty ratio of the moving command signal, and wherein the modulated moving voltage is applied to the solenoid to generate a current corresponding to the moving voltage in the solenoid.

17. The controller according to claim 15, wherein the driver performs a pulse-width modulation of the voltage from the power source in accordance with the duty ratio of the maintaining command signal, and wherein the modulated maintaining voltage is applied to the solenoid to generate a current corresponding to the maintaining voltage in the solenoid.

* * * * *

UNITED STATES PATENT AND TRADEMARK OFFICE
CERTIFICATE OF CORRECTION

PATENT NO.    : 6,275,368 B1                                        Page 1 of 1
DATED         : August 14, 2001
INVENTOR(S)   : Tadashi Yamada et al.

It is certified that error appears in the above-identified patent and that said Letters Patent is hereby corrected as shown below:

<u>Title page,</u>
 Item [56], References Cited, FOREIGN PATENT DOCUMENTS please add:

-- 08-282997    10/96    Taiwan..............B66F  9/24
   7-28276      5/95     Taiwan..............F16K  31/06 --.

Signed and Sealed this

Twenty-seventh Day of August, 2002

*Attest:*

*Attesting Officer*

JAMES E. ROGAN
*Director of the United States Patent and Trademark Office*